US010928968B2

(12) United States Patent
Garrett et al.

(10) Patent No.: US 10,928,968 B2
(45) Date of Patent: Feb. 23, 2021

(54) DETECTING MECHANICAL INTERACTIONS

(71) Applicant: Peratech Holdco Ltd, Richmond (GB)

(72) Inventors: Michael Robert Garrett, Stockholm (SE); Joel Erik Christoffer Metelius, Nakca (SE)

(73) Assignee: Peratech Holdco Ltd, Richmond (GB)

( * ) Notice: Subject to any disclaimer, the term of this patent is extended or adjusted under 35 U.S.C. 154(b) by 0 days.

(21) Appl. No.: 16/488,109

(22) PCT Filed: Feb. 23, 2018

(86) PCT No.: PCT/GB2018/000031
§ 371 (c)(1),
(2) Date: Aug. 22, 2019

(87) PCT Pub. No.: WO2018/154265
PCT Pub. Date: Aug. 30, 2018

(65) Prior Publication Data
US 2019/0384474 A1    Dec. 19, 2019

(30) Foreign Application Priority Data

Feb. 25, 2017   (GB) ..................................... 1703109

(51) Int. Cl.
*G06F 3/045* (2006.01)
*G06F 3/041* (2006.01)
*G06F 1/3234* (2019.01)

(52) U.S. Cl.
CPC ............ *G06F 3/045* (2013.01); *G06F 1/3243* (2013.01); *G06F 3/04144* (2019.05); *G06F 3/04146* (2019.05)

(58) Field of Classification Search
CPC .... G06F 3/04146; G06F 3/0416; G06F 3/045; G06F 3/0414; G06F 1/3243
See application file for complete search history.

(56) References Cited

U.S. PATENT DOCUMENTS

2006/0033722 A1* 2/2006 Chiu ..................... G06F 1/3203
345/173
2010/0134437 A1* 6/2010 Yang ..................... G06F 3/0416
345/174

(Continued)

FOREIGN PATENT DOCUMENTS

| EP | 2194453 A1 | 6/2010 |
| WO | 2014/094283 A1 | 6/2014 |

OTHER PUBLICATIONS

Peratech, Peratech—Peratech collaborates to improve human-to-notebook PC interfaces with 3D pressure-sensing QTC technology, Oct. 27, 2016, XP55464194, retrieved from the Internet on Apr. 3, 2018: https://www.peratech.com/press-releases.html/2016/10/27/peratech-collaborates-to-improve-human-to-notebook-pc-interfaces-with-qtc-technology/.

(Continued)

*Primary Examiner* — Brent D Castiaux
(74) *Attorney, Agent, or Firm* — Richard M. Goldberg (57) ABSTRACT

A detection element (104) is energised. The detection element is substantially non-conductive without an application of pressure and becomes increasingly conductive in response to pressure application. A processor (101) is interrupted from a low-power dissipation state in response to a first detectable application of pressure by the detection-element. The processor is then configured to monitor further pressure applied to the same detection element.

13 Claims, 8 Drawing Sheets

(56) References Cited

U.S. PATENT DOCUMENTS

| | | | |
|---|---|---|---|
| 2012/0026124 A1* | 2/2012 | Li | G06F 3/045 |
| | | | 345/174 |
| 2012/0262416 A1* | 10/2012 | Kitamura | G06F 1/3262 |
| | | | 345/174 |
| 2015/0091859 A1 | 4/2015 | Rosenberg | |
| 2015/0234446 A1* | 8/2015 | Nathan | G06F 3/0416 |
| | | | 345/174 |
| 2016/0139725 A1* | 5/2016 | Noguchi | G06F 3/044 |
| | | | 345/174 |

OTHER PUBLICATIONS

Peratech, Peratech—Peratech promises a smarter user interface for smartphones and tablets by applying QTC orce-sensing technology to every surface, Oct. 20, 2016, XP55464245, retrieved from the Internet on Apr. 3, 2018: https://www.peratech.com/press-releases.html/2016/10/20/peratech-smarter-user-interface-for-smartphones-tablets-with-qtc-force-sensing-on-every-surface/.

* cited by examiner

DETECTING MECHANICAL INTERACTIONS

CROSS REFERENCE TO RELATED APPLICATIONS

This application claims priority from United Kingdom Patent Application number 1703109.7, filed on Feb. 25, 2017, the whole contents of which are incorporated herein by reference.

BACKGROUND OF THE INVENTION

The present invention relates to a method of detecting a mechanical interaction. The present invention also relates to an apparatus for detecting mechanical interactions.

It is known to provide battery operated control devices that include a manually responsive touchscreen, such that functionality may be controlled in response to the movement of an operative's finger over the touchscreen. To provide this level of functionality, it is accepted that electrical energy is continually required and therefore must be replenished, often by performing a recharging operation on a daily basis.

In other applications, devices are provided with conventional single-use batteries, with an expectation that these batteries will not need to be replaced too often. Devices of this type therefore tend to have physical buttons operating conventional switches.

BRIEF SUMMARY OF THE INVENTION

According to a first aspect of the present invention, there is provided a method of detecting a mechanical interaction, in accordance with the claims.

A voltage present between the reference resistance and the threshold resistance may supply an interrupt signal to the processor. A first input of the processor may receive the interrupt signal during the first mode and the first input may be grounded by the processor prior to entering the second mode. A voltage present between the sensor element and the reference resistance may supply an input signal to the processor during the second mode.

According to a second aspect of the present invention, there is provided an apparatus for detecting mechanical interactions, according to the claims.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art.

DETAILED DESCRIPTION OF EXAMPLE EMBODIMENTS

FIG. 1

Figure 1:
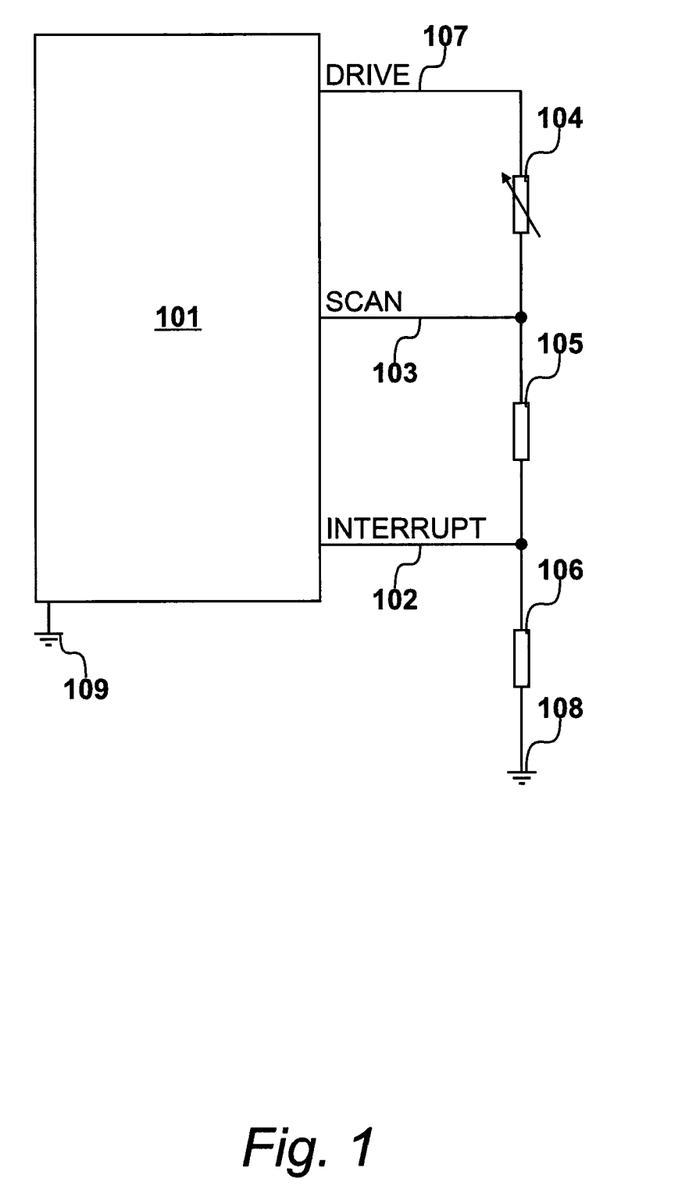
FIG. 1 illustrates an embodiment of the invention.

An embodiment of the present invention is illustrated in FIG. 1. The apparatus may be considered as being configured to detect mechanical interactions, taking the form of an applied force or an applied pressure. In an embodiment, this applied force or pressure is achieved by the application of a user's finger or thumb upon a control device, although it should be appreciated that the essential elements of the invention may be deployed in alternative environments.

A processor 101 includes an interrupt-input 102 and a data-input 103. A detection-element 104 is substantially non-conductive without an application of pressure and becomes increasingly conductive with increasing applied pressure. An example of a device that satisfies these characteristics is described in greater detail with reference to FIG. 2.

The processor is configured to operate in a first mode and is also configured to operate in a second mode. The first mode may be identified as a low-power dissipation mode, such that, upon entering said first mode, the processor 101 enters a low-power dissipation state. In an embodiment, communication pins of the micro-controller are configurable under program control. Thus, many of the pins may be selected as providing an output, a driving voltage, an input, scanning an input voltage, or as an interrupt. Thus, in the first mode of operation, a particular input pin is selected as providing the interrupt functionality.

During the low-power dissipation states (the first mode of operation) the device is arranged to receive an interrupt signal in response to a first detectable application of pressure upon the detection-element. Upon detecting this first application of pressure, the processor 101 is configured to then enter its second mode of active monitoring. During the second mode of active monitoring, further pressure applied to the detection-element is monitored. In this way, it is possible for the same detection-element 104 to be responsive to applied pressure in both the first mode of low-power dissipation and the second mode of active monitoring. It is not necessary to provide separate detection devices for interrupting the processor from its low-power dissipation state and then performing the active monitoring functions during the second mode of operation. The application of devices of the type identified by the present application allows the same device, when appropriately configured, to achieve both types of functionality.

It should be appreciated that many circuit configurations are possible in order to achieve the result of allowing the same device to facilitate both types operation. In the embodiment of FIG. 1, the processor 101 is configured to supply current through a series connection of the sensor-element 104 with a reference-resistor 105 and a threshold-resistor 106 during the first mode of operation. Current is derived from an interface pin of the processor 101 being configured as an output, thereby supplying an output drive voltage to an output drive line 107. The resulting current then flows through the series connection of the detection-element 104, the reference-resistor 105 and a threshold-resistor 106 to ground at a first-ground-connection 108.

In this embodiment, the interrupt signal is derived from a voltage at the series connection of the reference-resistor 105 and the threshold-resistor 106; this combination of series-connected resistors defining a potential divider.

The processor 101 is itself connected to ground, as illustrated by second-ground-connection 109. In this way, the nature of interface pins provided by the processor 101 are configurable such that, in an embodiment, the interrupt-input 102 may be reconfigured after an input signal has been received. Thus, in an embodiment, the processor 101 is configured to establish a first-input 102 as an interrupt-input during the first mode, for receiving the interrupt signal via the previously described potential divider. Thereafter, the first-input 102 is connected to ground, via the second-ground-connection 109, under program control upon entering the second mode.

The connection of interrupt-line 102 to ground effectively removes the threshold-resistor 106 from the circuit, such that the full available voltage appears across the detection-element 104 and the reference-resistor 105. In an embodiment, the processor is configured to monitor a second-input 103 as a data-input. This data-input receives a voltage between the sensor-element 104 and the reference-resistor 105, effectively defining a second potential divider, during the second mode.

Thus, to summarise, during the first mode of operation, a voltage appearing at the connection between the reference-resistor 105 and the threshold-resistor 106 provides an interrupt signal to the processor 101. In response to receiving this interrupt signal, the interrupt line 101 is grounded thereby effectively removing the threshold-resistor 106. Conventional operation, in accordance with a second mode is now adopted by receiving, as input data, the voltage appearing between the detection-element 104 and the reference-resistor 105. However, it should be appreciated that other circuit configurations are possible such that, in response to a mechanical interaction, a resistance change of the detection-element 104 may be used to interrupt the processor from a low-power dissipation state, and is then used to provide input data relating to the extent of further mechanical interactions.

FIG. 2

Figure 2:
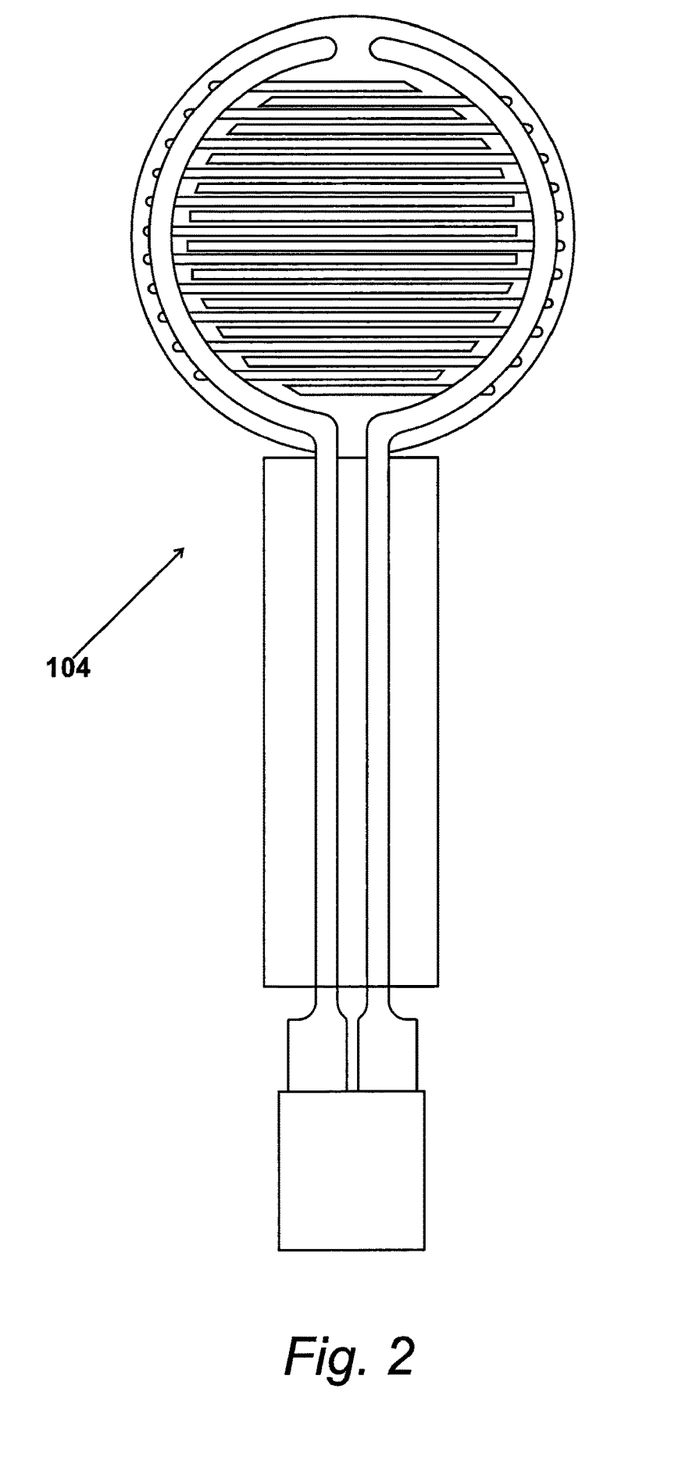
FIG. 2 shows an individual sensor-element.

An example of a detection-element 104 of the type illustrated in FIG. 1 is detailed in FIG. 2. In this example, the detection-element takes the form of a sensor including material sold under the trademark QTC by the current applicant. Material of this type is also identified by the designation "quantum tunneling compound".

QTC sensors of the type illustrated in FIG. 2 are pressure sensitive membrane switches, that change resistance in a predictable manner following an application of force or pressure. As described with reference to FIG. 1, the sensor has electrical characteristics of a variable resistor, allowing it to be implemented within an electronic system, such as that described with reference to FIG. 1, implemented as forming part of a voltage divider circuit, as previously described.

FIG. 3

Figure 3:
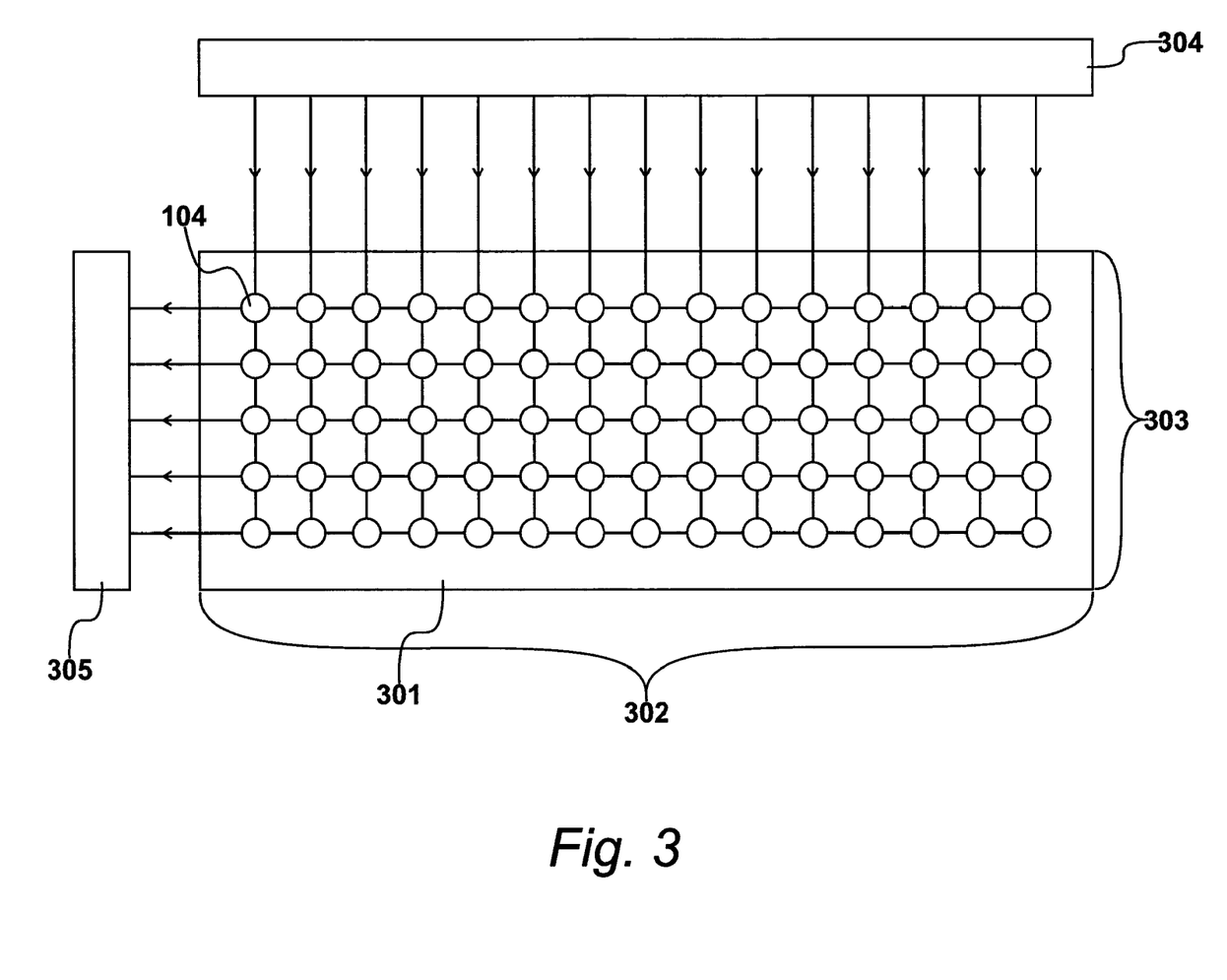
FIG. 3 shows an array of detection-elements.

In an embodiment, it is possible for the detection-element 104 to be included with a plurality of similar detection-elements to provide an array 301 of detection-elements. In this example, the array 301 consists of fifteen columns 302 and five rows 303. A first-column-connector 304 receives driving voltages from a processor, as described with reference to FIG. 4. Similarly, a first-row-connector 305 supplies scanned voltages to the processor. Without the application of pressure, all of the detection-elements within the array 301 remain non-conductive. However, when sufficient pressure is applied, at the position of a particular detection-element, that detection-element does become conductive, thereby providing a transmission path between an input driving line and an output scanned line.

FIG. 4

An array, of the type described with reference to FIG. 3, connects to a processing circuit of the type shown in FIG. 4. Thus, the first-column-connector 304 connects to a second-column-connector 401 and the first-row-connector 305 connects to a second-row-connector 402.

A processor, implemented as a micro-controller 403 monitors detection-elements sequentially to produce multi-plexed input data. Thereafter, the micro-controller 403 is configured to determine a position of a mechanical interaction from the multiplexed input data. Thus, the micro-controller 403 performs a scanning operation, as identified in FIG. 5 and described in detail with reference to FIG. 6. This allows the detection-elements of the array 301 to be sequentially energised via a plurality of input lines 404. Furthermore, during energisation of each input line, plural output lines 405 are sequentially monitored. In this embodiment, each output line includes a reference-resistor. In this example, five output lines are present, resulting in the provision of a first-reference-resistor 411, a second-reference-resistor 412, a third-reference-resistor 413, a fourth-reference-resistor 414 and a fifth-reference-resistor 415. Thus, each respective reference-resistor produces a respective input voltage during the second mode.

In this embodiment, each series connection of a detection-element with a respective reference-resistor is connected in series with a common threshold-resistor 416, which is again connected to a third-ground-connection 417.

As described with reference to FIG. 6, sequential scanning is performed during the second mode and it is appreciated that performing scanning of this type requires significant levels of power to be drawn from power supplies that in many embodiments may be implemented by a battery.

During the first mode, power consumption is minimised and, as previously described. The micro-controller is configured to enter a low-power dissipation state. An interrupt input 418 is provided and the micro-controller 403 is configured to be interrupted from its low-power dissipation state and thereafter enter the second mode, upon receiving an interrupt signal.

Upon entering the first mode and prior to entering the low-power dissipation state, all of the input lines 404 are energised by the micro-controller 403 which in turn receives an input supply voltage from an input supply 419. However, without a mechanical interaction, all of the detection elements 104 remain non-conductive, such that the input lines 404 remain substantially at the supply voltage (from input supply 419) with minimal current flowing to the third-ground-connection 417. Thus, in this first mode, the array 301 is active, in that a voltage is being applied, but due to the non-conductive nature of the detection-elements, the actual current flow is minimal, typically being no more than several microamps.

Upon mechanical pressure being applied to anywhere within the array, one or more of the detection-elements may become conductive (assuming sufficient pressure is applied). As a result of this, current will flow through one or more of the reference-resistors 411 to 415 and will therefore flow through the common-threshold-resistor 416. Thus, as a consequence of this, a voltage divider is established between the reference-resistors and the common-threshold-resistor 416 resulting in an interrupt voltage being supplied on the interrupt-line 418. As previously described, upon receiving an interrupt, the micro-controller 403 enters the second mode, resulting in interrupt-line 418 being connected to a fourth-ground-terminal 420 such that, during the scanning operations, voltages are derived from the series connections of the detectors in the array and the reference-resistors 411 to 415.

FIG. 5

Figure 5:
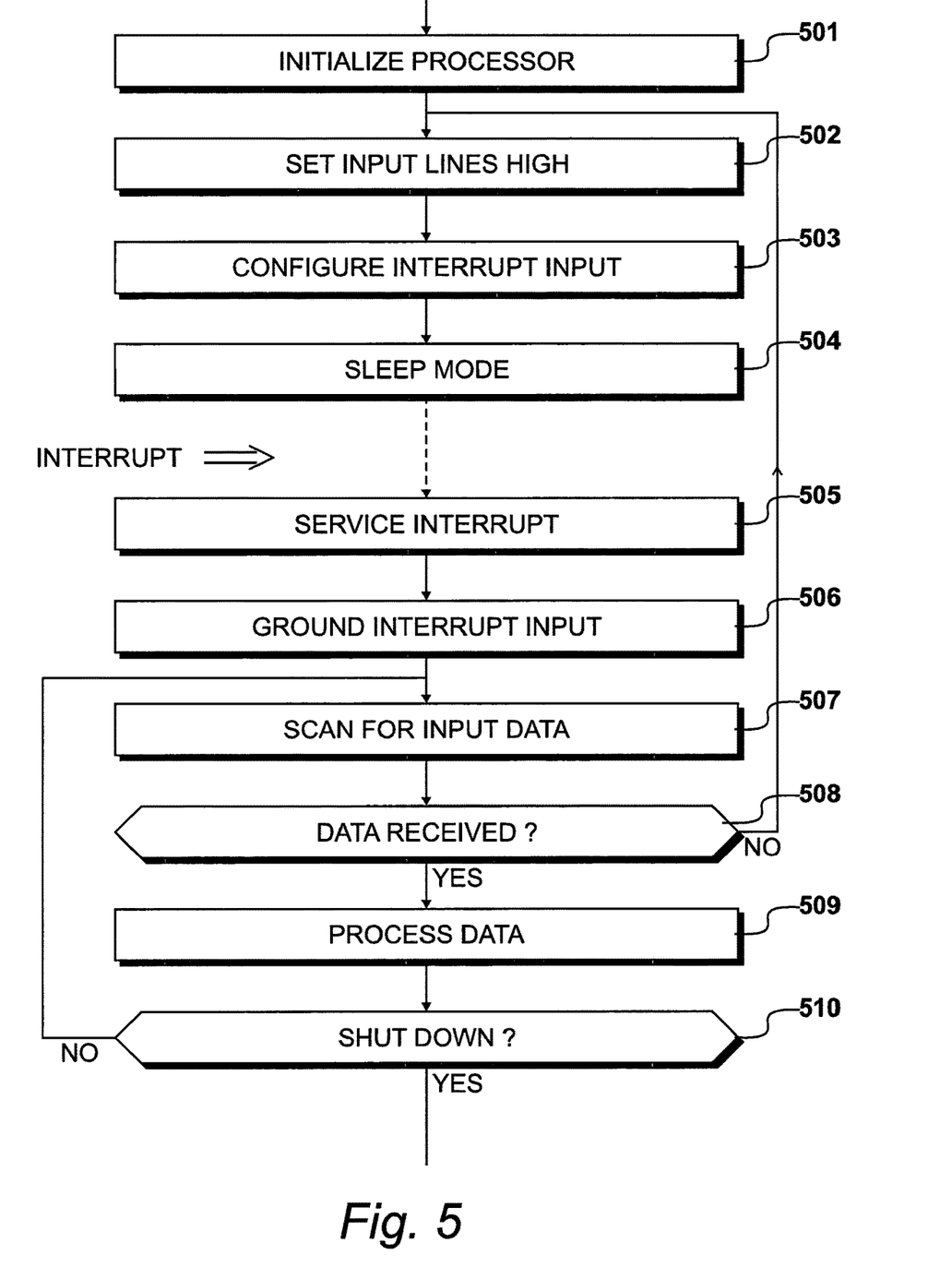
FIG. 5 shows operations performed by the microcontroller identified in FIG. 1.

Operations performed by the micro-controller 403 to provide the functionality of a device embodying an aspect for the present invention are shown in FIG. 5. At step 501 the micro-controller is initialised, usually by the application of an appropriate power supply, such as that received from the power-input 419. At step 502 the input-lines 404 are set high, that is to say, all fifteen (in this embodiment) receive substantially the supply voltage from the power-input 419. As previously described, without a mechanical interaction, virtually no current flows, therefore power dissipation is minimal while this operational voltage is maintained.

At step 503 the interrupt-line 418 is configured, such that the micro-controller is now responsive to an interrupt-signal being received on this line. Thus, after being configured in this way, the micro-controller 403 enters a minimal power dissipation state (or sleep mode) at step 504.

With appropriately selected threshold-resistors (411 to 415) it is possible for the device to undergo a degree of mechanical interaction without rendering any of the detectors sufficiently conductive to provide an interrupt signal. Thus, for example, it is possible for the device to be placed face down on a surface, with its own weight being insufficient to energise the electronics into the second mode. However, in an embodiment, the threshold-resistors are selected so that the device is sufficiently responsive to a modest application of pressure by a user, thereby rendering one or more of the detection-elements conductive.

As previously described, in the minimal power dissipation state, all input lines (drive lines) 404 are energised, therefore each sensor has the drive voltage applied thereto and may allow the current to flow through its respective scanned lines (output lines) 405. Thus, when current flows through any of the drive lines and then returns via any of the sense lines, one of the reference-resistors in combination with the common-threshold-resistor will allow sufficient current flow to ground. Consequently, a voltage will appear across the common-threshold-resistor 416, resulting in an interrupt voltage being applied to the interrupt-line 418. This results in the micro-controller receiving an interrupt signal, as illustrated in FIG. 5.

In response to receiving an interrupt signal, the interrupt is serviced, as illustrated at step 505. This results in the micro-controller leaving its first mode (of low-power dissipation) and entering the second mode or operational mode. The interrupt input has now served its purpose and is set low by being connected to the fourth-ground-connection 420 as illustrated at step 506.

At step 507, scanning procedures are performed to identify input data. Thus, a multiplexing operation takes effect, as detailed in FIG. 6, with the input-lines 404 being energised sequentially.

In an embodiment, a predetermined number of cycles are performed before a question is asked at step 508 as to whether data has been received. It is possible that the device could have been interrupted accidentally, possibly while being moved between locations. Thus, having put the device down, no further input data will be received such that, after a predetermined threshold, the question asked at step 508 will be answered in the negative and the device will return to its minimal power dissipation state (or first mode) by returning to step 502.

If the question asked at step 508 is answered in the affirmative, to the effect that data has been received, the received data is processed at step 509 in a manner that may be in accordance with known techniques. Thereafter, a question is asked at step 510 as to whether a shutdown condition is to occur and when answered in the negative, further scanning is performed at step 507.

The procedures described with respect to FIG. 5 provide a method of detecting a mechanical interaction in which detection-elements are energised that are substantially non-conductive without an application of pressure and become increasingly conductive in response to pressure application. A processor is interrupted from a low-power dissipation state in response to a first detected application of pressure by the detection element. Furthermore, the processor is configured to monitor further pressure applied to the detection elements, such that the same detection elements operate in both a first mode, to interrupt the processor, and in a second mode to provide input data to the processor.

FIG. 6

Figure 6:
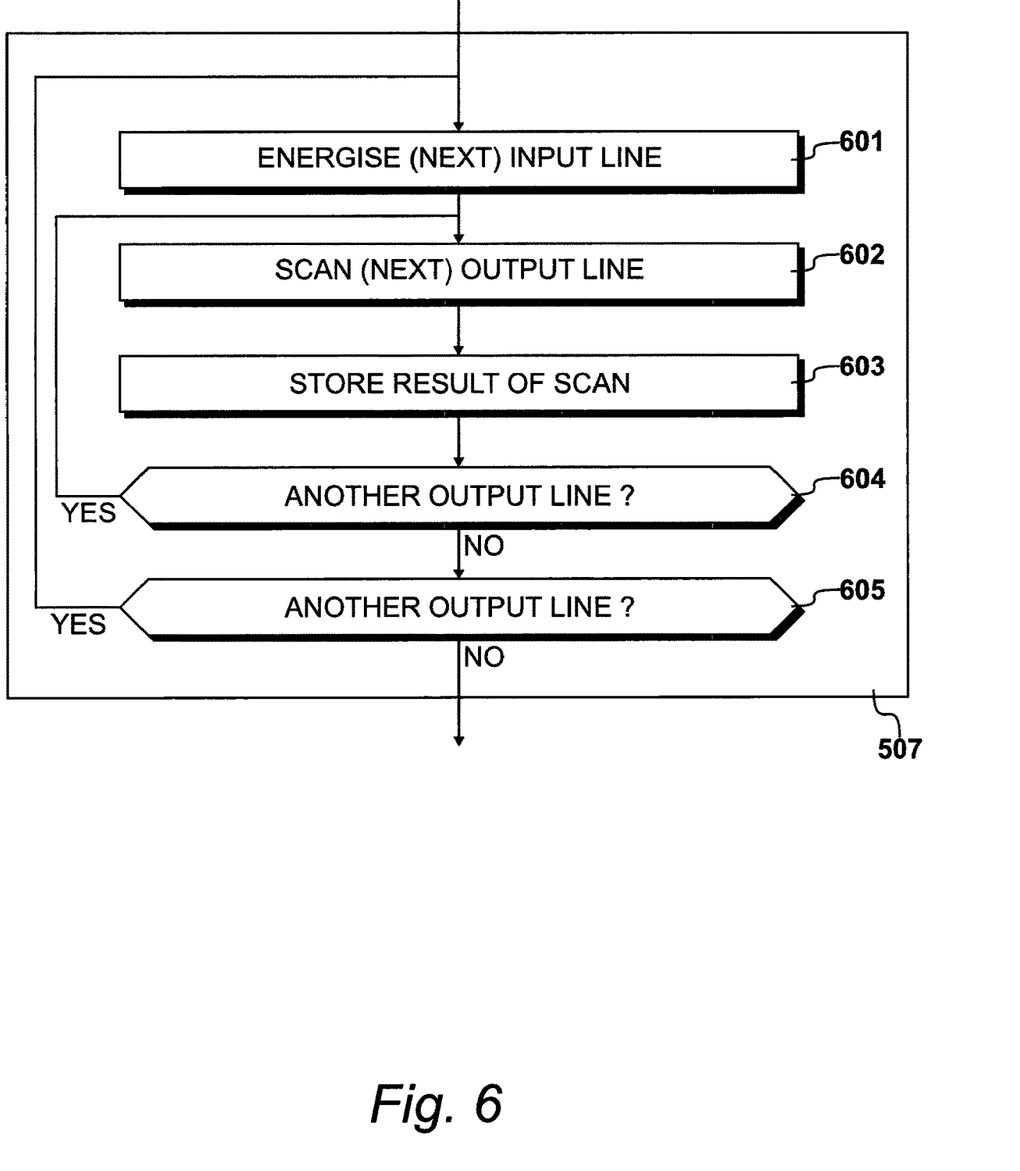
FIG. 6 details a scanning process identified in FIG. 5.

Procedures 507 for scanning to produce input data are detailed in FIG. 6.

At step 601, an input line is selected and energised. Thereafter, at step 602, an output line is selected and scanned. This results in a particular result being obtained for a particular sensor at the intersection of the energised input line and the scanned output line. Thus, at step 603, the result of this scan is stored.

At step 604 a question is asked as to whether another output line is present and when answered in the affirmative, this next output line is selected and scanned at step 602. Thus, this procedure repeats such that, for a particular input line, all of the output lines will have been scanned.

Thereafter, a question is asked at step 605 as to whether another input line, (404) is present and when answered in the affirmative, the next input line is energised at step 601. Thus, the scanning procedures are again repeated such that, for this input line, all of the output lines are scanned.

Eventually, all of the input lines will have been energised and a question asked at step 605 will be answered in the negative. The received data is then evaluated at steps 508 and 509 as previously described with reference to FIG. 5.

FIG. 7

Figure 4:
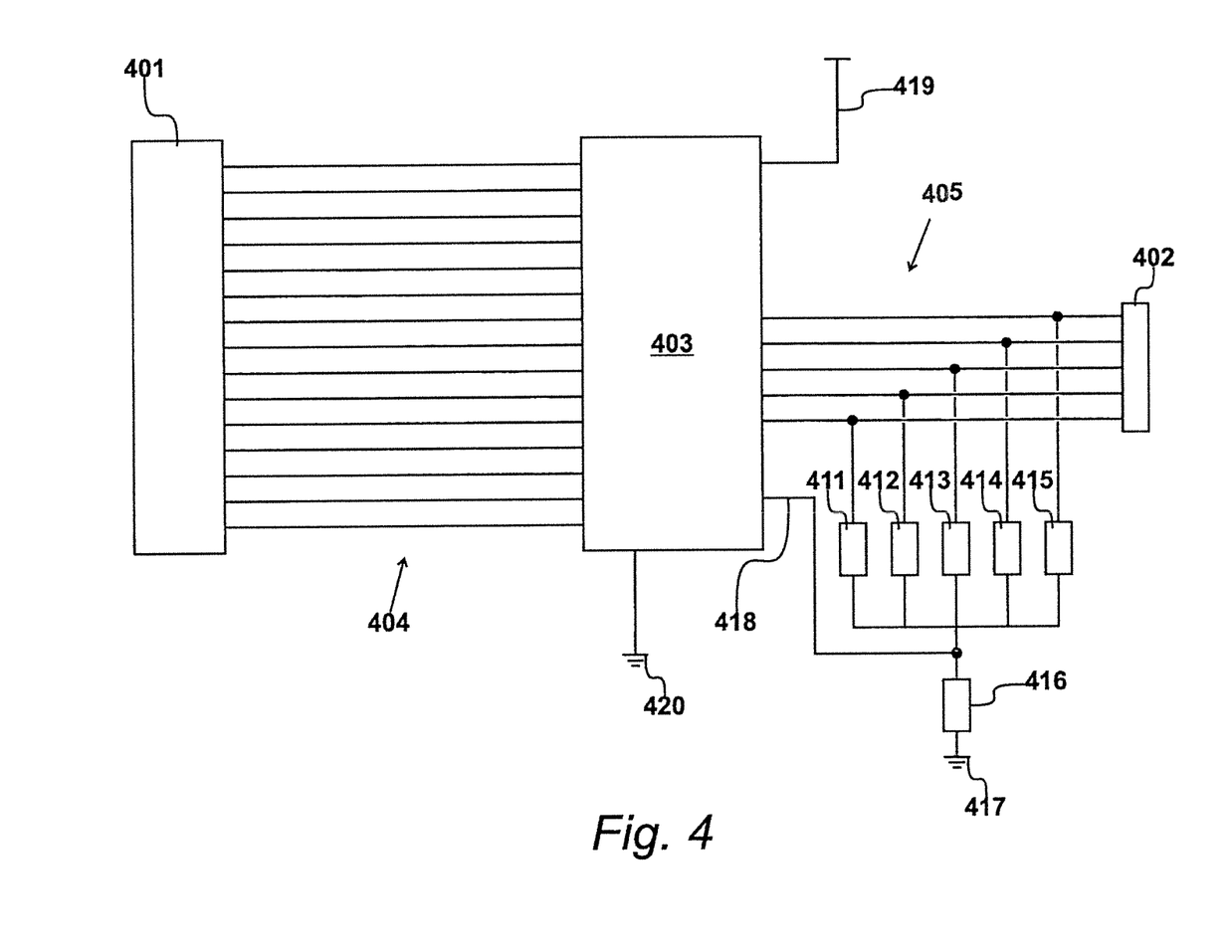
FIG. 4 details a circuit for multiplexing devices of the type shown in FIG. 2, including a microcontroller.
Figure 7:
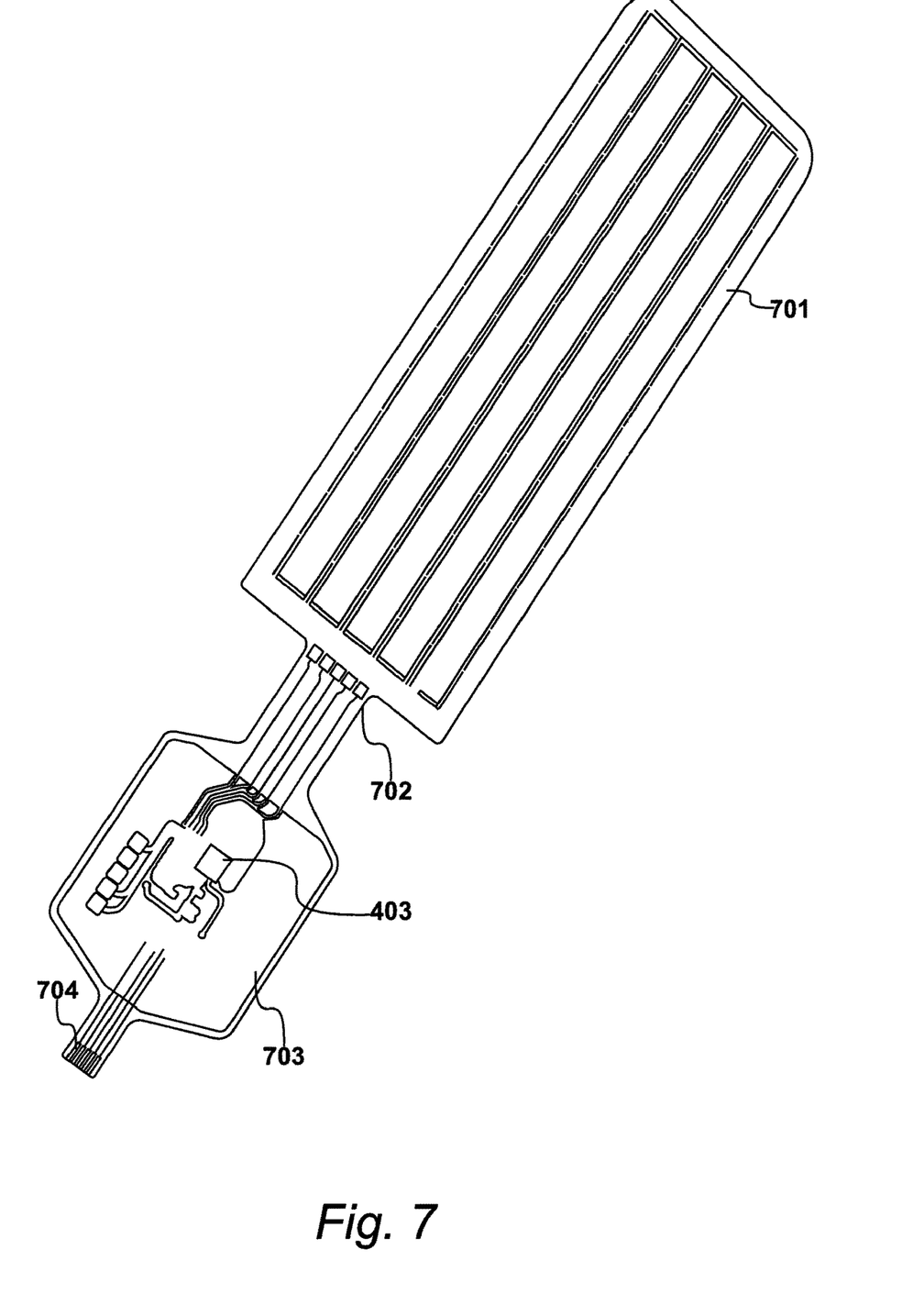
FIG. 7 shows sensor-elements of the type identified in FIG. 2 mounted on a substrate.

A physical realisation of the apparatus shown schematically in FIG. 3 and FIG. 4 is illustrated in FIG. 7.

The detection-elements are mounted on a substrate 701 and the substrate 701 includes connectors 702, thereby implementing connectors 304, 305, 401 and 402 (previously described). The micro-controller 403 is mounted on a appropriate circuit-board 703 and connection to external devices is provided via an interface 704.

FIG. 8

Figure 8:
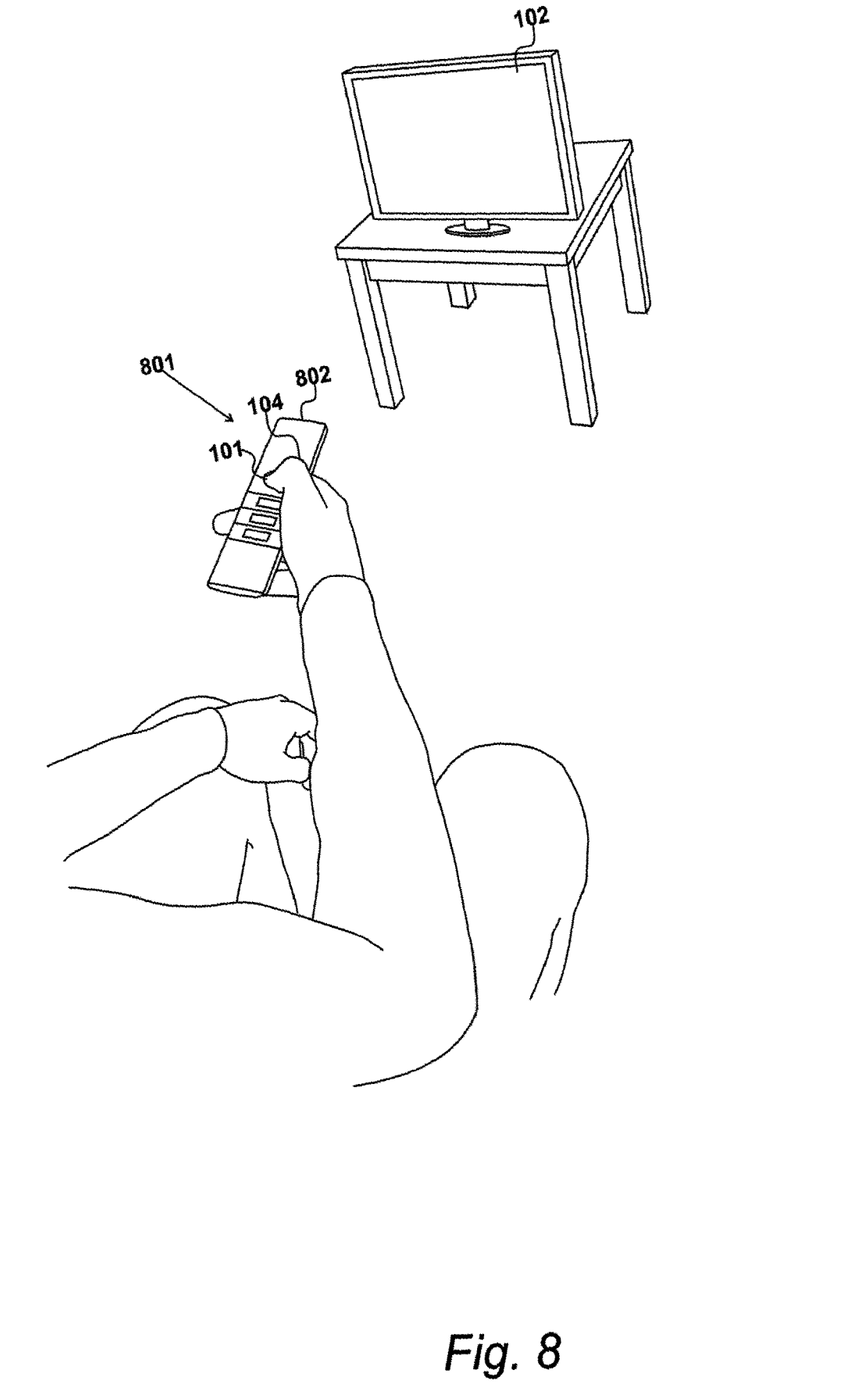
FIG. 8 shows a device constructed with a substrate of the type shown in FIG. 7.

The subassembly of FIG. 7 may be included within a control device, such as control device 801, arranged to produce an output control signal. For the purposes of illustration, the control device 801 may control a television receiver.

The control device 801 includes a housing 802 that in turn defines an interactive-surface 803. The interactive-surface 803 is arranged to receive mechanical interactions, in the form of applied pressure or force, due to operations performed by a user. Thus, the substrate 701 is placed in mechanical proximity to the interactive surface 803, thereby allowing the mechanical operations performed by a user to control the resistivity of the detection-elements within the array.

The invention claimed is:

1. A method of detecting a mechanical interaction, comprising the steps of:
    energising a detection element, in which said detection element is substantially non-conductive without an application of pressure and becomes increasingly conductive in response to pressure application;
    interrupting a processor from a low-power dissipation state in response to a first detectable application of pressure by said detection element; and
    configuring said processor to monitor further pressure applied to said detection element, such that said detection element operates in both a first mode to interrupt said processor and in a second mode to provide input data to said processor; and
    said detection element is energised by supplying current through a series connection of said detection element, a reference resistance and a threshold resistance during said first mode.

2. The method of claim 1, wherein a voltage present between said reference resistance and said threshold resistance supplies an interrupt signal to said processor.

3. The method of claim 2, wherein:
    a first input of said processor receives said interrupt signal during said first mode; and
    said first input is grounded by said processor prior to entering said second mode.

4. The method of claim 3, wherein a voltage present between said sensor element and said reference resistance supplies an input signal to said processor during said second mode.

5. An apparatus for detecting mechanical interactions, comprising:
    a processor having an interrupt input and a data input; and
    a detection element that is substantially non-conductive without an application of pressure and becomes increasingly conductive with increasing applied pressure; wherein said processor is configured to:
    enter a low power dissipation state during a first mode;
    receive an interrupt signal during a said low power dissipation state in response to a first detectable application of pressure upon said detection element and thereby enter a second mode of active monitoring; and
    during said second mode, monitor further pressure applied to said detection element, such that the same said detection element is responsive to applied pressure in both said first mode of low power dissipation and said second mode of active monitoring; and
    supply current through a series connection of said detection element, a reference resistor and a threshold resistor during said first mode.

6. The apparatus of claim 5, wherein said interrupt signal is derived from a voltage at the series connection of said reference resistor and said threshold resistor.

7. The apparatus of claim 6, wherein said processor is configured to:
    establish a first input as an interrupt input during said first mode, for receiving said interrupt signal; and
    ground said first input pin upon entering said second mode.

8. The apparatus of claim 7, wherein said processor is configured to:
    monitor a second input as a data input; and
    receive the voltage between said sensor element and said reference resistor at said second input during said second mode.

9. The apparatus of claim 5, in which said detection element is included with a plurality of similar detection elements to provide an array of detection elements.

10. The apparatus of claim 9, wherein said processor is configured to:
    monitor the detection elements in said array sequentially to produced multiplexed input data; and
    determine a position of a mechanical interaction from said multiplexed input data.

11. The apparatus of claim 10, wherein:
    said detection elements are sequentially energised via a plurality of input lines;
    during the energisation of each said input line, plural output lines are sequentially monitored; and
    each said input line includes a respective reference resistor for producing respective input voltages during said second mode.

12. The apparatus of claim 11, wherein each series connection of a detection element with a respective reference resistor is connected in series with a common threshold resistor.

13. The apparatus of claim 9, wherein mechanical interactions are caused by a manual application of pressure and said processor is configured to produce an output control signal.

* * * * *